United States Patent
Yamamoto et al.

(10) Patent No.: US 7,992,095 B2
(45) Date of Patent: Aug. 2, 2011

(54) CHARACTER INPUT SYSTEM INCLUDING APPLICATION DEVICE AND INPUT SERVER

(75) Inventors: Yoshio Yamamoto, Osaka (JP); Masahiro Muikaichi, Osaka (JP)

(73) Assignee: Panasonic Corporation, Osaka (JP)

( * ) Notice: Subject to any disclaimer, the term of this patent is extended or adjusted under 35 U.S.C. 154(b) by 1078 days.

(21) Appl. No.: 11/587,384

(22) PCT Filed: Apr. 25, 2005

(86) PCT No.: PCT/JP2005/007790
§ 371 (c)(1),
(2), (4) Date: Jun. 19, 2007

(87) PCT Pub. No.: WO2005/103947
PCT Pub. Date: Nov. 3, 2005

(65) Prior Publication Data
US 2007/0294618 A1    Dec. 20, 2007

(30) Foreign Application Priority Data
Apr. 27, 2004    (JP) .................. 2004-130959

(51) Int. Cl.
*G06F 3/048* (2006.01)

(52) U.S. Cl. ........ 715/780; 715/752; 715/784; 715/785; 715/786; 715/787; 715/788

(58) Field of Classification Search .................. 715/752, 715/780, 784–787
See application file for complete search history.

(56) References Cited

U.S. PATENT DOCUMENTS

| | | | | |
|---|---|---|---|---|
| 5,285,387 A | * | 2/1994 | Kurahara et al. | 715/205 |
| 5,732,152 A | * | 3/1998 | Sakai et al. | 382/189 |
| 5,999,951 A | * | 12/1999 | Shibuya | 715/234 |
| 6,104,381 A | * | 8/2000 | Watanabe et al. | 345/160 |
| 6,441,824 B2 | * | 8/2002 | Hertzfeld | 345/472 |
| 6,839,877 B2 | * | 1/2005 | Iwata | 715/246 |
| 7,068,288 B1 | * | 6/2006 | Good et al. | 345/619 |

(Continued)

FOREIGN PATENT DOCUMENTS

JP    60-238967    11/1985

(Continued)

OTHER PUBLICATIONS

Masahiko Narita, Hideki Hiura; "The Input Method Protocol" Version 1.0, X Consortium Standard, X Version 11, Release 6.4, Fujitsu Limited, SunSoft, Inc., 1994.

*Primary Examiner* — Tuyetlien T Tran
(74) *Attorney, Agent, or Firm* — Wenderoth, Lind & Ponack, L.L.P.

(57) ABSTRACT

Since a editing character string is managed by an input server, an application device cannot know whether scrolling is necessary. Accordingly, there has been a problem that it is impossible to properly realize a scroll function. Accordingly, a receiving unit receives an instruction from a user operation or an application device, and a character string editing unit edits a character string according to the instruction received. Further, an output management unit manages output, and a state notifying unit notifies a change of the internal state to the application device. When a output area does not have enough empty space to display an editing character, the state notifying unit instructs the application device to shift the confirmed character string. The application device, upon receiving the instruction, scrolls the confirmed character string upward.

5 Claims, 9 Drawing Sheets

U.S. PATENT DOCUMENTS

| | | | |
|---|---|---|---|
| 7,107,204 B1* | 9/2006 | Liu et al. | 704/2 |
| 2002/0007382 A1* | 1/2002 | Nojima et al. | 707/532 |
| 2002/0089546 A1* | 7/2002 | Kanevsky et al. | 345/800 |
| 2003/0038788 A1* | 2/2003 | Demartines et al. | 345/173 |
| 2003/0133162 A1* | 7/2003 | Lupien et al. | 358/3.26 |
| 2004/0102957 A1* | 5/2004 | Levin | 704/3 |
| 2004/0196273 A1* | 10/2004 | Mitsumura et al. | 345/204 |
| 2004/0205830 A1* | 10/2004 | Kaneko | 725/135 |
| 2004/0236779 A1* | 11/2004 | Kinoshita et al. | 707/101 |
| 2004/0239639 A1* | 12/2004 | Stavely et al. | 345/173 |
| 2005/0060138 A1* | 3/2005 | Wang et al. | 704/1 |
| 2005/0099407 A1* | 5/2005 | Pennington et al. | 345/179 |
| 2005/0099408 A1* | 5/2005 | Seto et al. | 345/179 |
| 2005/0262220 A1* | 11/2005 | Ecklund et al. | 709/219 |

FOREIGN PATENT DOCUMENTS

| | | |
|---|---|---|
| JP | 03-144846 | 6/1991 |
| JP | 04-167167 | 6/1992 |

* cited by examiner

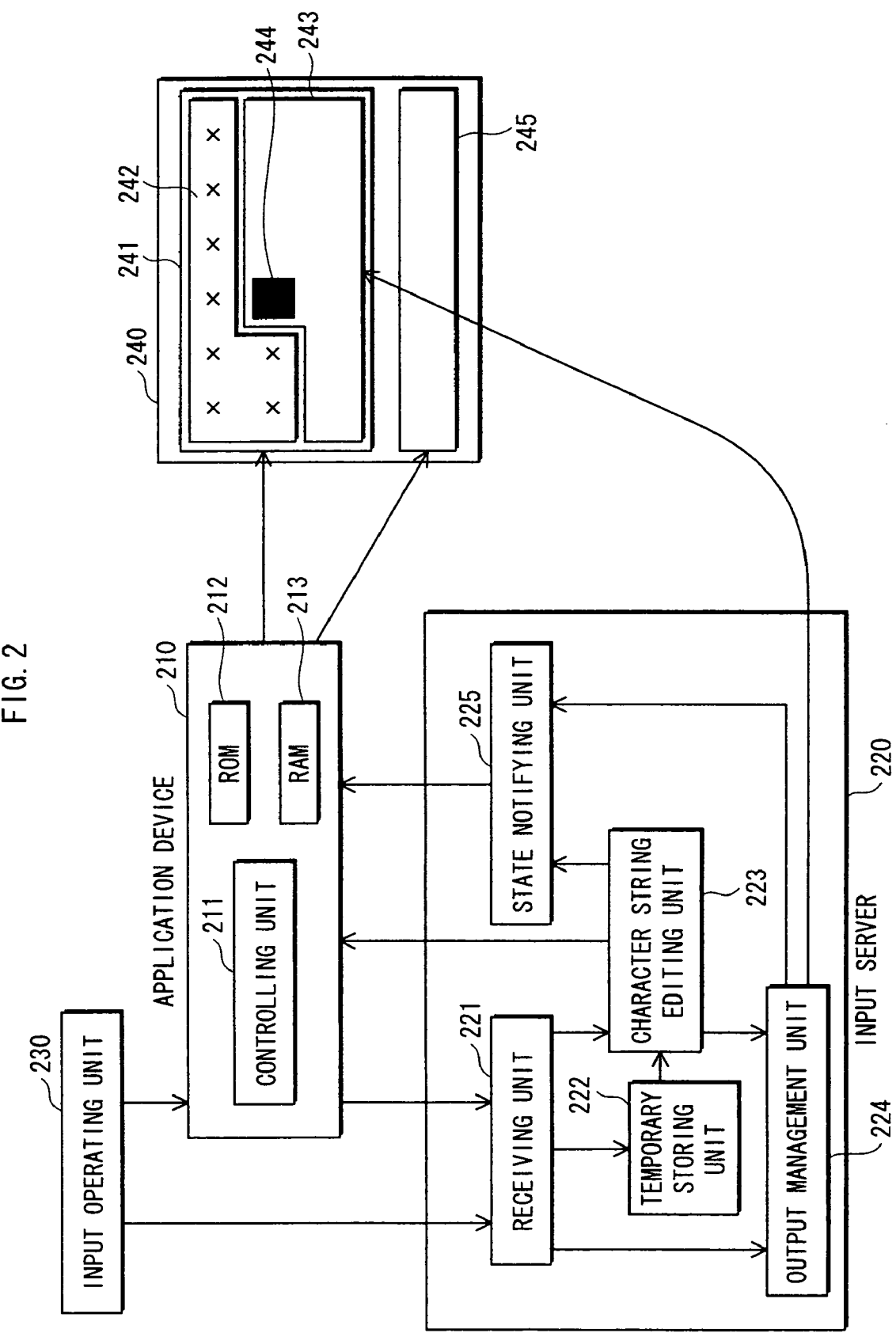

CHARACTER INPUT SYSTEM INCLUDING APPLICATION DEVICE AND INPUT SERVER

BACKGROUND OF THE INVENTION

1. Field of Invention

The present invention relates to a character string processing system that includes an application device and an input server, which processes a character string using a display device having a small character string display area.

2. Description of the Related Art

A method of linking an application device which processes a character string with an input server which inputs the character string to the application device is explained, for example, in Document 1.

According to this conventional technology, the input server has a kana-kanji conversion function and a GUI function for the user operations, edits an input character string, and sends a confirmed character string to the application device, as the editing result. The application device displays the confirmed character string in a display area. Meanwhile, the input server, while editing the input character string, displays a character string of which the editing is in progress, based on the display information received from the application device, independently from the application device.

Document 1: Japanese Patent Application Publication No. H3-144846.

BRIEF SUMMARY OF THE INVENTION

The Problems the Invention is Going to Solve

In such a conventional technology, when the input server displays the input character string in a small display area of the display device, there is the case where the input server can not display all the characters constituting the input character string, as shown in FIGS. 1A and 1B.

In FIG. 1A, a confirmed character string "文字列を入力する" 101 is displayed in a display area 102. A cursor 103 indicates a starting point from which the next confirmed character string is to be input.

Here, when the user inputs a character string "ために、くらいあんとは" (a combination of a character string 104 and a character (string) 105), to the input server, the input server displays the character string 104 "ために、くらいあんと" from the position of the cursor 103 in the display area 102, as an editing character string. However, the last input character 105 "は" is not displayed because no more space is left in the display area 102 to display the character "は" after the confirmed character 101 has been displayed therein, as shown in FIG. 1B.

When all the characters of the input character string are not displayed, the user cannot confirm the editing of the character string.

Also, it may happen that the editing of the character string displayed by the input server hides part of the confirmed character string from view, inhibiting the attempt of the user to update part of the confirmed character string.

The present invention, in view of the above-mentioned problems, aims to provide a character string processing system that can update the confirmed character string displayed by the application device so that all the characters constituting the editing character string, of which the editing is in progress, can be displayed in the display area by the input server.

Means for Solving the Problem

To solve the above-stated problem, the present invention is provided as a character string processing system comprising an application device for displaying and processing an edited and confirmed character string in a display area, and an input server for editing an input character string. The application device includes: a first controlling unit operable to display a confirmed character string in the display area, and send display information to the input server; and a second controlling unit operable, upon being notified of a character display state from the input server, to shift the confirmed character string partially or entirely in the display area. Further, the input server includes: a receiving unit operable to receive the display information from the application device, and receive a character which is input by a user; a judging unit operable to judge whether or not an output area, which is provided in the display area for displaying input characters, has enough empty space to display the input character; a notifying unit operable, if a result of the judgment is negative, to notify the application device of the character display state; and a display controlling unit operable to display the input character in a space created by the shift of the confirmed character string, in accordance with the display information received by the receiving unit.

Effects of the Invention

With the construction described above, when the output area does not have enough empty space to display a character that is input by the user in the input server, the character display state is notified to the application device. Upon being notified of the character display state, the application device shifts the displayed confirmed character string to create a space in the output area, so that the input server can display the input character in the display area.

The present invention is also provided as an input server for editing an input character string and outputting a confirmed character string to an application device for displaying and processing an edited and confirmed character string in a display area. The input server includes: a receiving unit operable to receive display information from the application device, and receive a character which is input by a user; a judging unit operable to judge whether or not an output area, which is provided in the display area for displaying input characters, has enough empty space to display the input character; a notifying unit operable, if a result of the judgment is negative, to notify the application device of a character display state; and a display controlling unit operable to display the input character in a space created by the application device by shifting a confirmed character string in the display area, in accordance with the display information received by the receiving unit.

With the above-described construction, the input server can display an input character string in the display area in a reliable manner.

The above-stated input server may further comprise: a converting unit operable to convert a character or a character string displayed by the display controlling unit; and an output unit operable to output a character string that was converted by the converting unit and was then confirmed.

With the above-described construction, the input server includes, for example, a kana-kanji conversion function, and can convert an input hiragana character string into a kana kanji mixed character string and output it to the application device as a confirmed character string.

The above-stated input server may further includes a temporary storing unit operable to temporarily store one or more input characters, wherein the display information includes information indicating how many characters can be displayed in the output area, and position information indicating a position in the display area from which a next confirmed character string is to be displayed by the application device. In addition, the judging unit judges, in accordance with the position information, whether or not the output area has enough empty space to display the one or more characters stored in the temporary storing unit, and the display controlling unit displays the one or more characters in a space that was created by the application device by scrolling a confirmed character string in the display area.

With the above-described construction, it is possible to create a space in the output area by scrolling the confirmed character string displayed in the display area, so as to display all the input character strings in the display area.

The above-stated input server may further include a temporary storing unit operable to temporarily store one or more input characters, wherein the display information includes information indicating how many characters can be displayed in the output area, and position information indicating a position in the display area from which a next confirmed character string is to be displayed by the application device. Further, the judging unit judges, in accordance with the position information, whether or not the output area has enough empty space to display the one or more characters stored in the temporary storing unit, and the display controlling unit displays the one or more characters in a space that was created by the application device between characters of a confirmed character string by shifting forward apart of the confirmed character string that starts at the position indicated by the position information.

With the above-described construction in which characters are inserted in a space between characters of a confirmed character string, it is possible to display characters input in the input server so as not to hide the confirmed character string.

In the above-stated input server, the receiving unit may further receive from the user an instruction to delete a character that is displayed in a space between characters of a confirmed character string, the input server further comprises a delete unit operable to delete the character displayed in the space between characters, from the temporary storing unit, wherein after the character is deleted from the temporary storing unit, the notifying unit notifies the application device of the deletion, and the display controlling unit deletes display of the character.

With this structure, it is possible to shift the confirmed character string when the character displayed by the input server is deleted.

The present invention is also provided as a character string display method for an input server for editing an input character string and outputting a confirmed character string to an application device for displaying and processing an edited and confirmed character string in a display area. The character string display method includes: receiving display information from the application device, and receiving a character which is input by a user; judging whether or not an output area, which is provided in the display area for displaying input characters, has enough empty space to display the input character; notifying, if a result of the judgment is negative, the application device of a character display state; and displaying the input character in a space created by the application device by shifting a confirmed character string in the display area, in accordance with the display information received in the receiving step.

With the above-described method, it is possible to display an input character string, which is input in the input server, in the display area in a reliable manner.

The present invention is also provided as a control method for an application device which displays and processes a confirmed character string that was edited by an input server for editing an input character string. The control method includes: displaying a confirmed character string in the display area, and sending display information to the input server; and shifting, upon being notified of a character display state from the input server, the confirmed character string partially or entirely in the display area.

With the above-described method, it is possible to shift the confirmed character string displayed in the display area, according to the character display state notified from the input server.

In the above-stated control method, the display information may include information indicating how many characters can be displayed in an output area that is provided in the display area for displaying characters, and position information indicating a position in the display area from which a next confirmed character string is to be displayed by the application device. Additionally, the shifting step includes: judging whether or not the position information indicates a position in the confirmed character string; scrolling the confirmed character string if a result of the judgment is negative; and shifting forward a part of the confirmed character string that starts at the position indicated by the position information, if a result of the judgment is positive.

With the above-described method, it is possible to create enough space in the output area to display an editing character string input in the input server, by scrolling the confirmed character string. Moreover, it is possible to display an editing character string input in the input server by shifting a part of the confirmed character string forward.

In the above-stated control method, the application device may store, in a storing area, a guidance to be displayed according to the character display state notified from the input server, wherein the shifting step includes selecting a guidance and displaying the selected guidance.

With the above-described method, it is possible to display a guidance in accordance with the input state in the input server.

BRIEF DESCRIPTION OF THE DRAWINGS

FIG. 2 shows a construction of a character string processing system in an embodiment of the present invention;

Figure 1A:
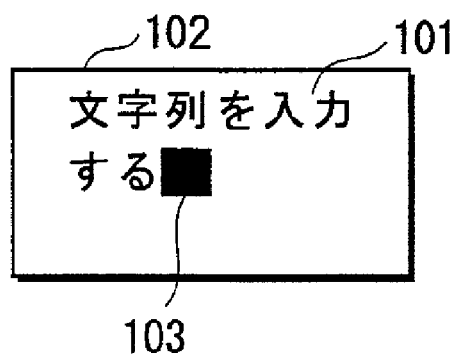
FIGS. 1A and 1B show how an input editing character string is displayed in a conventional character string processing system.
Figure 1B:
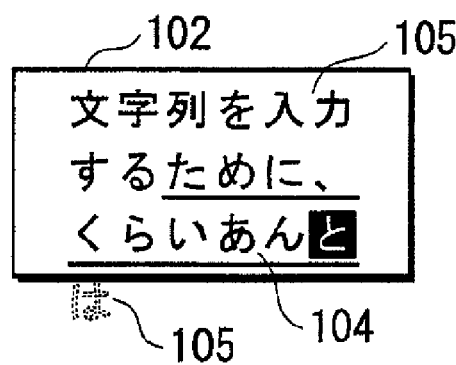

DESCRIPTION OF CHARACTERS 210 application device
211 controlling unit
212 ROM
213 RAM
220 input server
221 receiving unit
222 temporary storing unit
223 character string editing unit
224 output management unit
225 state notifying unit
230 input operating unit
240 display unit
241 display area
242 confirmed character string
243 output area
244 cursor
245 guidance display area

DETAILED DESCRIPTION OF THE INVENTION

The following describes a character string processing system of the present invention through embodiments, with reference to the attached figures.

First Embodiment

FIG. 2 shows an overall structure of the character string processing system of the present invention.

The character string processing system includes an application device 210, an input server 220, an input operating unit 230, and a display unit 240.

In the character string processing system, the application system 210 conforming to the X window system and the input server 220 conforming to the X Input Method Protocol constitute a client and a server, respectively.

The application device 210 includes a controlling unit 211, a ROM 212 in which an application program for the character string process is stored, and a RAM 213 that is used as a work area.

The input server 220 includes a receiving unit 221, a temporary storing unit 222, a character string editing unit 223, an output management unit 224, and a state notifying unit 225.

The input operating unit 230 includes operation keys used for inputting characters, and operation keys used for inputting instructions. The input operating unit 230 receives a user operation and notifies the application device 210 and the receiving unit 221 of the received operation as an event.

The displaying unit 240 is achieved by a liquid crystal display or the like. The screen of the displaying unit 240 is as small as the display panel of a mobile phone or the like, and can display only a small number of characters.

The display unit 240 includes a display area 241 for displaying confirmed character strings processed by the controlling unit 211 of the application device 210, and a guidance display area 245 for providing the user with a GUI.

The display area 241 for displaying confirmed character strings is composed of an area for displaying a confirmed character string 242, and an output area 243, being a residual area of the display area 241, in which an editing character string is displayed by the input server 220.

A cursor 244 is displayed at the start of the output area 243. The cursor 244 indicates the position from which the next confirmed character string is to be displayed.

The following explains the construction of the application device in detail.

The ROM 212 stores an application program for the character string process. The application program includes first display information that includes the size of the display area 241 of the display unit 240, and a font, size, and color of the characters to be displayed. The application program also includes a guidance that corresponds to various states of the editing character string input by the input server 220, such as a state in which characters have not been input, a state in which input characters have not been converted, and a state in which input characters are in the middle of a conversion.

The application program includes determining how to move a confirmed character string, when it receives from the input server 220 a notification of a state in which an editing character string cannot be displayed in the output area 243.

The RAM 213 is used as a work area by the controlling unit 211. When the controlling unit 211 receives a confirmed character string from the input server 220, it stores the received confirmed character string into the RAM 213. The position of the cursor 244, which indicates the position of the confirmed character string to be recorded next, is also recorded in the RAM 213 as second display information.

The controlling unit 211 controls the application device according to the application program stored in the ROM 212. When the application device is activated, the controlling unit 211 sends the display information to the input server 220. The display information includes the first and second display information recorded in the ROM 212 and the RAM 213, the first display information including the size of the display area 241 of the display unit 240, and a font type and the like of the characters, and the second information including the position of the cursor 244 and the like.

The controlling unit 211 displays the confirmed character string 242 received from the input server 220 in the display area 241, together with the cursor 244. Also, upon receiving an operation instruction from the input operating unit 230, the controlling unit 211 processes the confirmed character string according to the operation instruction, and displays a guidance in the guidance display area 245.

Upon receiving from the input server 220 a notification that the output area 243 does not have enough space to display characters, the controlling unit 211 scrolls the confirmed character string upward (by one row) and sends reconfigured second display information to the input server 220.

Also, upon receiving a notification of a display state, the controlling unit 211 performs as follows: when the cursor 244 is located on the confirmed character string 242, shifts rightward a part of the confirmed character string starting with the cursor 244 by one character; and when one character has been deleted, shifts leftward a part of the confirmed character string starting with the cursor 244 by one character.

Further, upon receiving a notification of a state that an editing character string has not been input, a notification of a state that the conversion process has not been performed, or a notification of a state that the conversion process is in progress, the controlling unit 211 reads out a guidance corresponding to the notified state from the ROM 212, and displays the read-out guidance in the guidance display area 245.

Next, the input server 220 will be described.

Upon receiving the display information from the controlling unit 211 of the application device 210, the receiving unit 221 sends the received display information to the output management unit 224. Similarly, when the output area 243 is reconfigured, the receiving unit 221 sends the reconfigured second display information to the output management unit 224.

Also, upon receiving an input character as an event from the input operating unit 230, the receiving unit 221 stores the input character in the temporary storing unit 222, and sends it to the character string editing unit 223.

Further, upon receiving an operation instruction either from the input operating unit 230 or via the controlling unit 211, the receiving unit 221 notifies the character string editing unit 223 of the operation instruction.

The character string editing unit 223 instructs the output management unit 224 to display the character sent from the receiving unit 221, in the output area 243 of the display unit 240. Upon receiving an instruction to delete the character, the character string editing unit 223 deletes the character from the temporary storing unit 222 and instructs the output management unit 224 to delete the character displayed in the output area 243.

The character string editing unit 223 has a function to convert input characters or character strings. For example, the character string editing unit 223 may convert hiragana (a type of Japanese character) to kanji (Chinese character). The character string editing unit 223 may convert hiragana to katakana (another type of Japanese character), or may convert a word of hiragana, katakana, or kanji to a synonym thereof.

Upon recognizing a state in which an editing character string to be displayed in the output area 243 has not been input, the character string editing unit 223 notifies the state notifying unit 225 of the state. Also, upon recognizing a state in which the editing character string has not been converted or a state in which the conversion of the editing character string is in progress, the character string editing unit 223 notifies the state notifying unit 225 of the state, respectively.

The character string editing unit 223 also has a function to convert the editing character string displayed in the output area 243 according to an instruction received from the receiving unit 221 (for example, convert the editing character string to a kana kanji mixed sentence according to a kana-kanji conversion instruction), update the contents of the temporary storing unit 222, and notify the output management unit 224 of the update. Also, upon receiving a confirmation instruction from the receiving unit 221, the character string editing unit 223 sends the editing character string displayed in the output area 243 to the application device 210, as a confirmed character string. At the same time, the character string editing unit 223 also notifies the output management unit 224 that the editing character string has become a confirmed character string, and deletes the contents of the temporary storing unit 222.

The output management unit 224 stores the display information and the reconfigured display information received from the application device via the receiving unit 221. Upon receiving an instruction to display characters in the display area 243 from the character string editing unit 223, the output management unit 224 judges whether or not the input area 243 has enough empty space to display the characters. If the display area 243 has enough empty space, then the output management unit 224 displays the characters specified by the character string editing unit 223 as an editing character string, and also displays the cursor together with the characters. Also, the output management unit 224 underlines the characters so that the user can recognize that the characters constitute the editing character string.

If the display area 243 does not have enough empty space, then the output management unit 224 instructs the state notifying unit 225 to notify the application device 210 that the display area 243 does not have enough empty space to display the characters input in the input server 220.

Upon receiving, from the application device 210 via the receiving unit 221, the display information indicating that the confirmed character string 242 has shifted partially forward, the output management unit 224 displays the character sent from the character string editing unit 223 on a space between divided parts of the confirmed character string 242, as an editing character, by attaching the cursor 244 to the character.

Upon receiving from the character string editing unit 223 a notification that the character displayed between divided parts of the confirmed character string 242 has been deleted, the output management unit 224 notifies the state notifying unit 225 that the editing character string has been deleted.

Upon receiving, from the application device 210 via the receiving unit 221, the display information indicating that the confirmed character string 242 has moved partially leftward, the output management unit 224 deletes the editing character together with the cursor 244 attached thereto.

Upon receiving from the character string editing unit 223 a notification that the editing character string displayed in the output area 243 has been converted from kana to kanji to be a kana kanji mixed sentence, the output management unit 224 deletes the editing character string and displays the kana kanji mixed sentence in the output area 243.

Also, upon receiving from the character string editing unit 223 a notification that the editing character string has become a confirmed character string, the output management unit 224 deletes the editing character string displayed in the output area 243.

Upon receiving from the output management unit 224 a notification that the output area 243 does not have enough empty space to display characters, the state notifying unit 225 notifies this to the application device 210.

Also, upon receiving from the output management unit 224 a notification that the editing character cannot be displayed between the divided parts of the confirmed character strings 242, or a notification that the editing character displayed between the divided parts of the confirmed character strings 242 is deleted, the state notifying unit 225 notifies the application device 210 of the received notification, as a state change.

The state notifying unit 225 receives from the character string editing unit 223 a notification of: (i) a state in which no character has been input as an editing character string to be displayed on the input area 243 (the state is referred to as an uninput state), or a state in which an editing character string has been input, more specifically; (ii) a state in which the editing character string has not been converted; or (iii) a state in which the conversion of the editing character string is in progress, and when the state changes, notifies the application device 210 of the change of the state.

The following explains how an editing character string input in the input server 220 is displayed on the display unit 240, in the present embodiment.

Figure 3A:
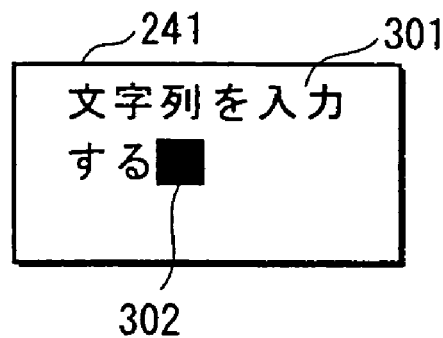
FIGS. 3A to 3C show how an editing character string input in the input server is displayed in the display area in the embodiment.

FIG. 3A shows that a confirmed character string 301 "文字列を入力する" is displayed in the display area 241 by the application device 210, a cursor 302 indicating a position from which the next character string is to be displayed.

Figure 3B:
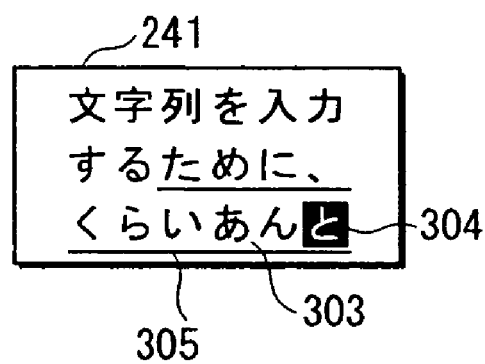

FIG. 3B shows that an editing character string 303 "ために、くらいあんと" is displayed with an underline 305 in the display area 241 by the output management unit 224. The cursor 304 is attached to the character "と" that is displayed in the last space of the output area. In this state, when an editing character "は" is input in the input server 220, the state notifying unit 225 notifies the application device that the output area does not have enough empty space to display the editing character.

Figure 3C:
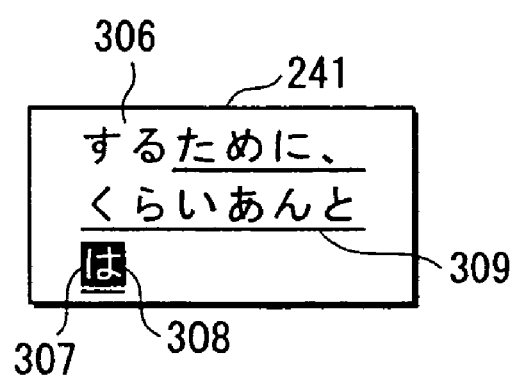

With this notification, as shown in FIG. 3C, the confirmed character string 301 is scrolled upward by one row, and the display information is reconfigured by the application device 210. Also, by the output management unit 224, the editing character string "ために、くらいあんとは" is displayed with an underline 309 to follow the confirmed character string 306 "する". The cursor 308 is also displayed, being attached to the editing character 307 "は".

As described above, upon receiving a notification of the display information of the input server 220, the application device 210 shifts the confirmed character string 301 on the display to enable the output area 243 to have enough empty space to display the editing character string input in the input server 220. The following explains how to insert an editing character string between characters of the confirmed character string.

Figure 4A:
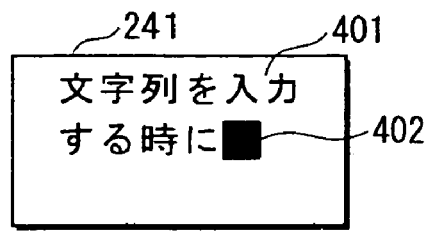
FIGS. 4A to 4D show how the input server inserts an editing character string into a confirmed character string in the embodiment.
Figure 4B:
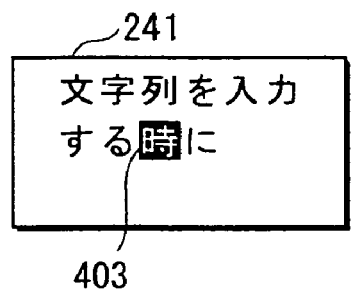

FIG. 4A shows that a confirmed character string 401 "文字列を入力する時に" and a cursor 402 are displayed in the display area 241. The application device 210 moves the cursor 402 to a space in which an editing character is to be inserted, in accordance with an operation instruction input by the user in the input operating unit 230, as shown in FIG. 4B.

When the input server 220 receives an input of an editing character 406 "た", the state notifying unit 225 notifies the application device 210 that it is not possible to display the editing character 406 within the confirmed character string 401. Upon receiving this notification, the application device 210 shifts rightward a confirmed character string 404 "時に" that starts with the cursor 403, and the output management unit 224 inserts the editing character 405 "た" into the space with the cursor 403, as shown in FIG. 4C.

Further, when an editing character string "めに、" is input, an editing character string 407 "ために、" is inserted, and a confirmed character string 409 "時に" is shifted forward to follow the inserted editing character string 407.

With regard to FIGS. 3A to 4D, the application device 210 manages the position of the cursor 302, 402, or 403, and displays the cursor. However, when the output management unit 224 of the input server 220 displays an editing character string, the output management unit 224 manages the position of the cursor 304, 308, 406, or 408 and display the cursor on presumption that the cursor indicates a position of an input character.

Figure 4C:
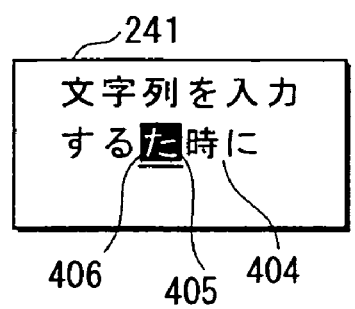
Figure 4D:
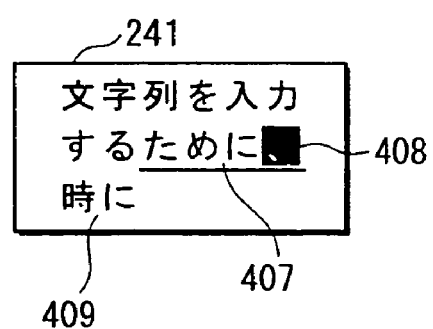

After the editing character 405 "た" is displayed as shown in FIG. 4C, when the input server 220 receives an instruction to delete the editing character 405 "た", the character string editing unit 223 deletes the character "た" from the temporary storing unit 222, and the state notifying unit 225 notifies the application device 210 that the editing character string "た" has been deleted. Then the application device 210 shifts the confirmed character string "時に" leftward, and at the same time the output management unit 224 deletes the editing character "た". With these operations, the screen is displayed as shown in FIG. 4B.

Figure 5A:
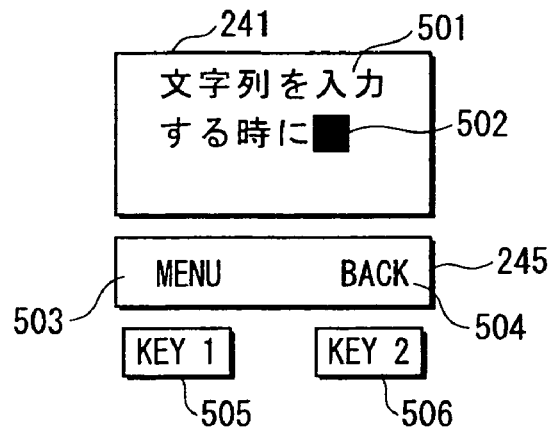
FIGS. 5A to 5C show characters input in the input server and a guidance displayed by the application device in the embodiment.
Figure 5B:
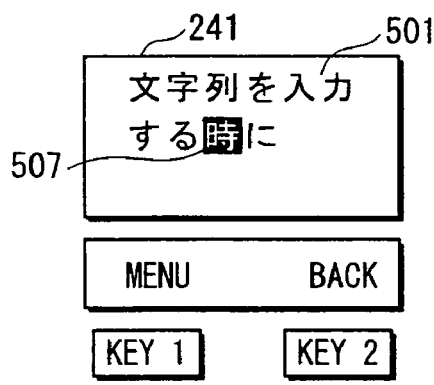
Figure 5C:
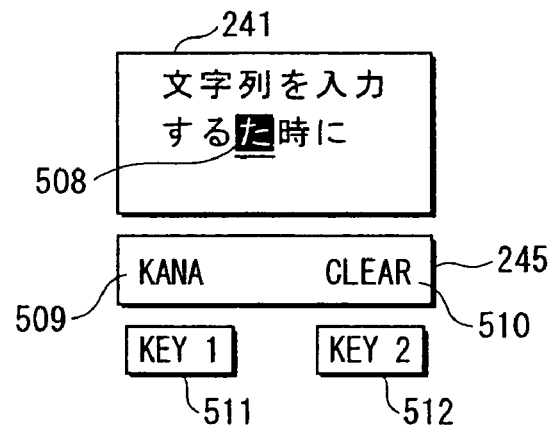
Figure 6:
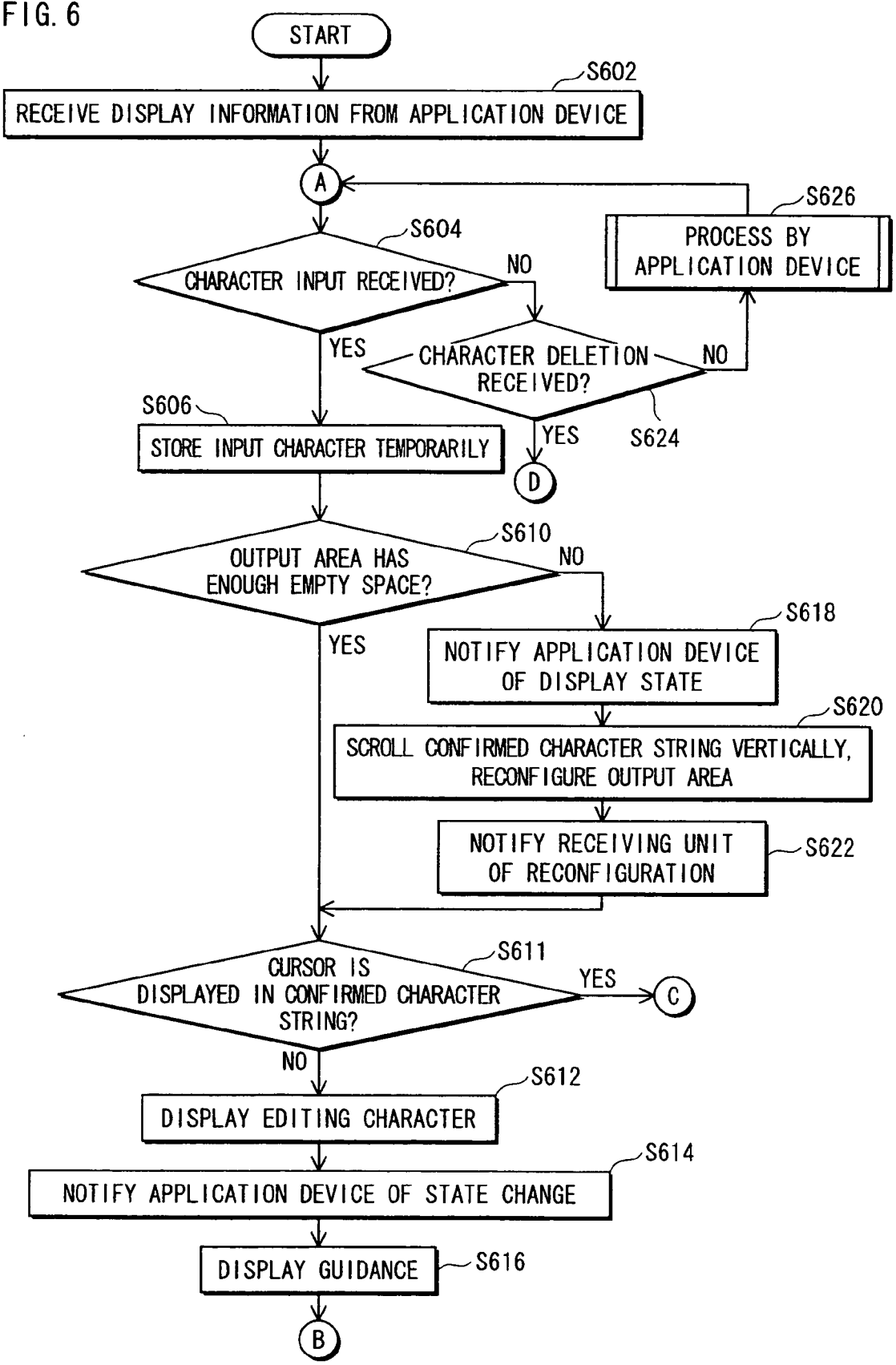
FIG. 6 is a flowchart (1) showing operation procedures in the embodiment.
Figure 7:
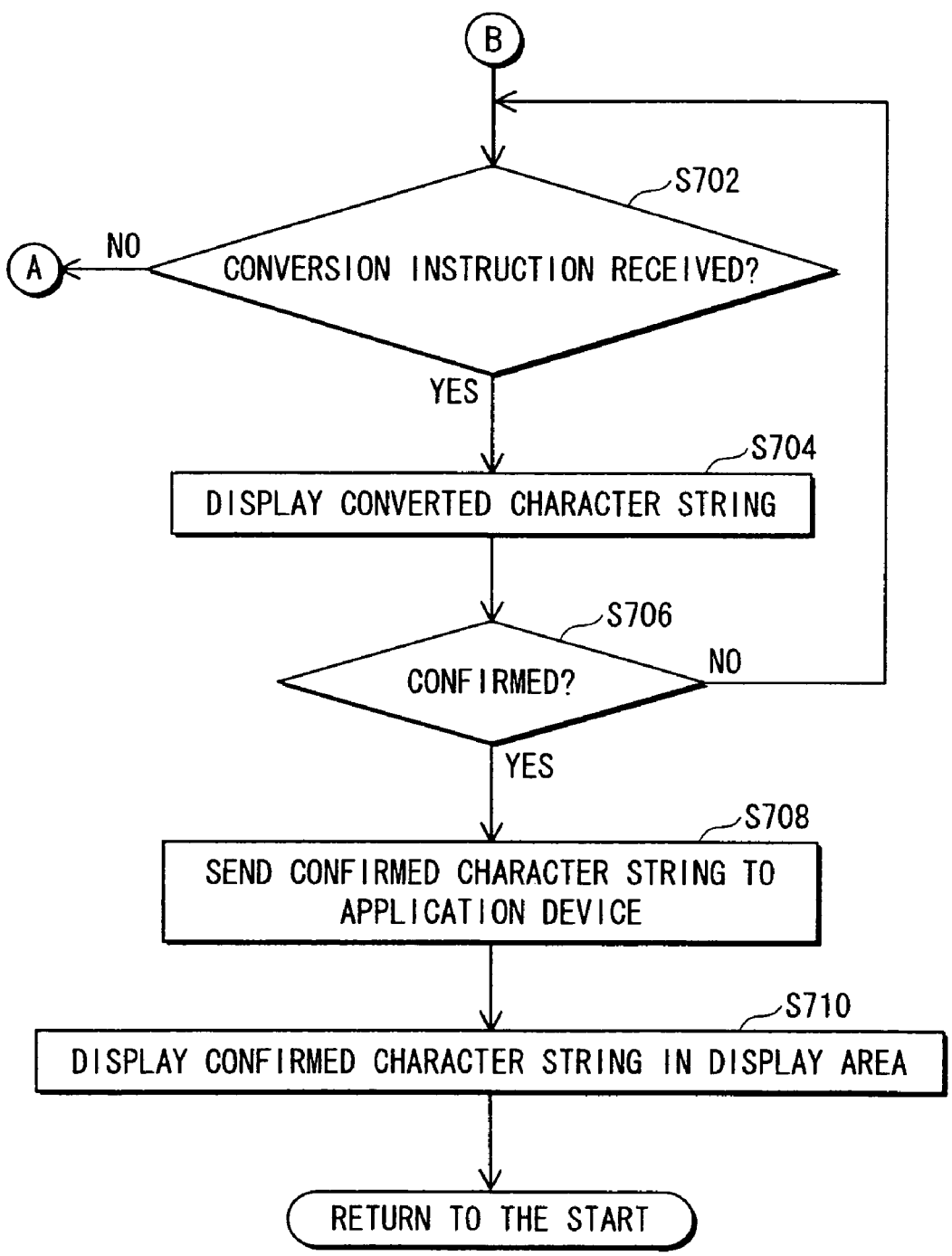
FIG. 7 is a flowchart (2) showing operation procedures in the embodiment.
Figure 8:
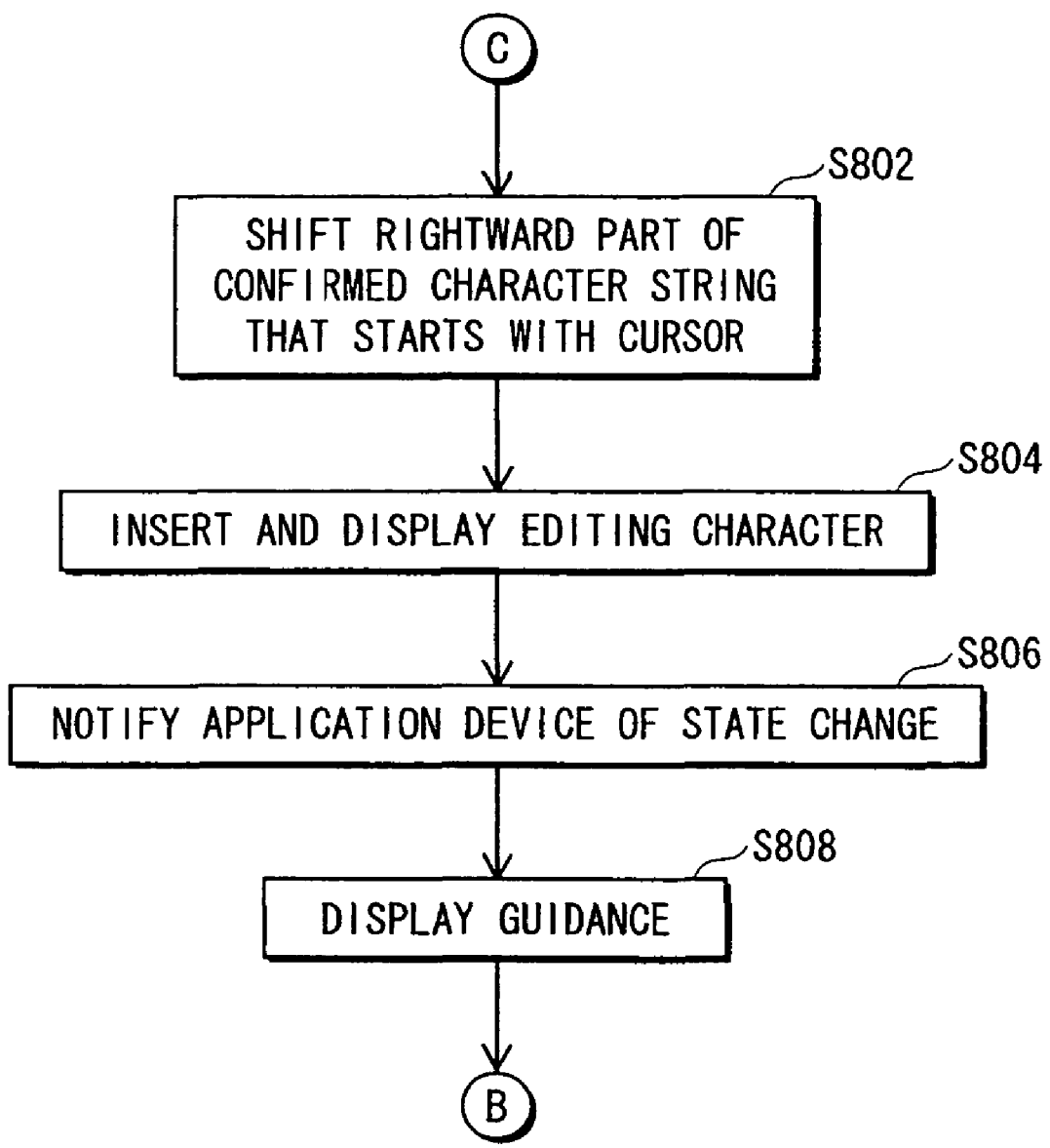
FIG. 8 is a flowchart (3) showing operation procedures in the embodiment.
Figure 9:
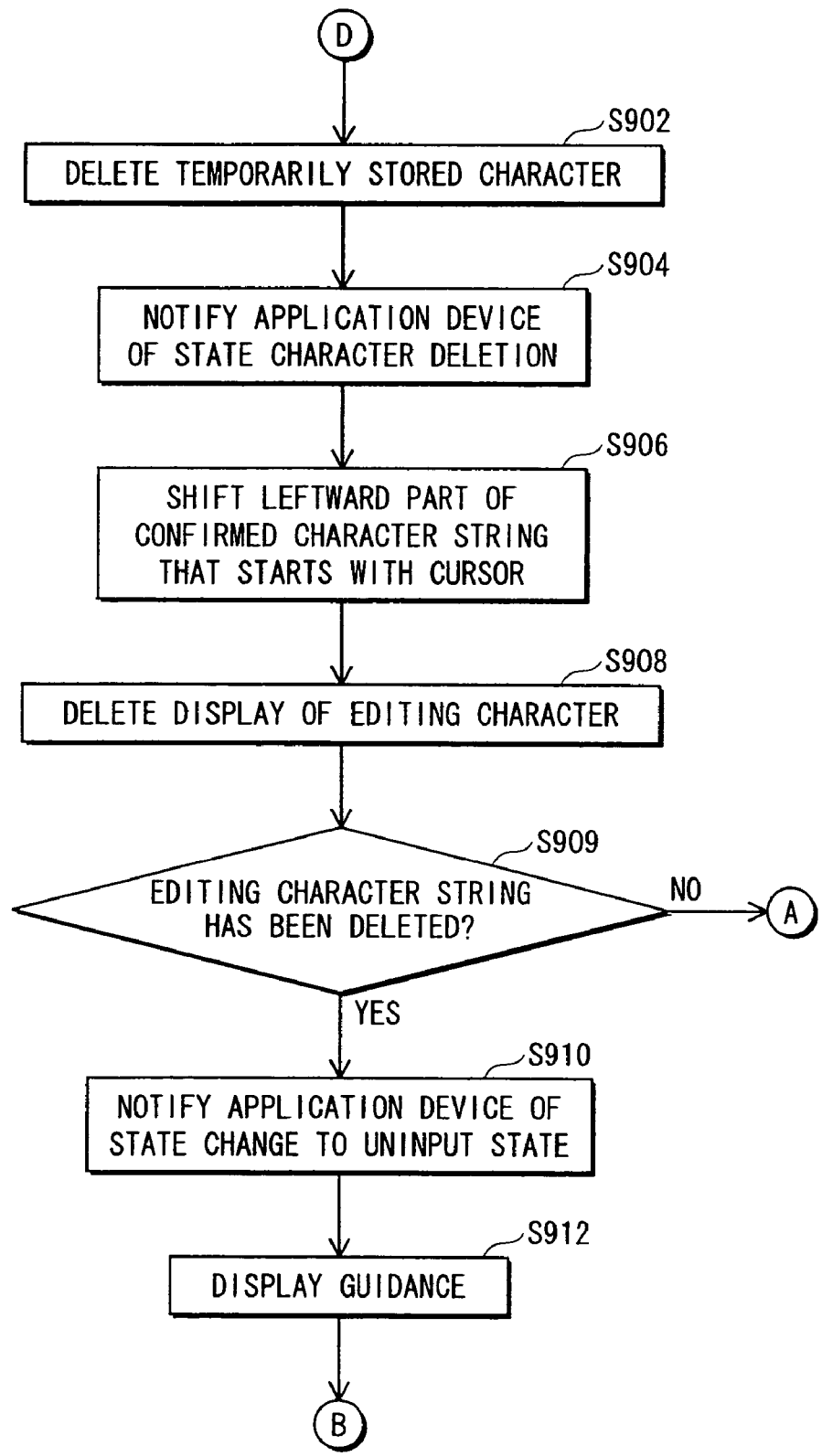
FIG. 9 is a flowchart (4) showing operation procedures in the embodiment.

FIGS. 5A to 5C show the guidance display area.

FIG. 5A shows that a confirmed character string 501 "文字列を入力するときに" is displayed in the display area 241, and that no editing character string is displayed by the input server 220. In such a case where an editing character string is "uninput", a guidance composed of an item 503 "menu" and an item 504 "back", is displayed in the guidance display area 245 by the controlling unit 211. It should be noted here that the item 503 "menu" and the item 504 "back" respectively correspond to a key 505 "key 1" and a key 506 "key 2" which constitutes the input operating unit 230.

FIG. 5B shows that the cursor, which is represented by the number "502" in FIG. 5A, has been moved according to an instruction input by the user and is now represented by the number "507", and that the guidance has not been changed since an editing character string is "uninput".

When an editing character 508 "た" is displayed by the input server 220, the state notifying unit 225 notifies the application device 210 that there is an unconverted editing character. In such a state where there is an unconverted editing character, a guidance composed of a menu item 509 "kana" and a menu item 510 "clear" is displayed in the guidance display area 245 by the controlling unit 211. It should be noted here that the menu item 509 "kana" and the menu item 510 "clear" respectively correspond to a key 511 "key 1" and a key 512 "key 2" which constitutes the input operating unit 230.

Next, the operation in the present embodiment will be described with reference to flowcharts shown in FIGS. 6 to 9.

After the input server 220 is activated, the receiving unit 221 receives the display information from the application device 210 and notifies the output management unit 224 of the received display information (S602).

The receiving unit 221 then judges whether or not an operation event notified from the input operating unit 230 or the application device 210 is a character input (S604). If the operation event is a character input, then the receiving unit 221 stores the input character in the temporary storing unit 222, and notifies the character string editing unit 223 of the input character as being an editing character (S606).

After step S606, if it is instructed by the character string editing unit 223 to display the character, then the output management unit 224 judges whether or not the output area 243 has enough empty space to display the input character (S610). If the output area 243 has enough empty space to display the input character, then the controlling unit 211 of the application device 210 judges whether a cursor is displayed in the confirmed character string 242 (S611). If the cursor is not displayed in the confirmed character string 242, then the output management unit 224 displays the input character in the output area 243 as an editing character (S612). If it is judged in S611 that the cursor is displayed in the confirmed character string 242, then the control moves to step S802.

Following step S612, the state notifying unit 225 notifies the application device 210 of a state change from "uninput" to "input" with respect to the input of an editing character string (S614).

The application device 210 displays a guidance corresponding to the input state, in the guidance display area 245 (S616).

If it is judged in S610 that the output area 243 does not have enough empty space to display the input character, then the state notifying unit 225 notifies the application device 210 that the input character cannot be displayed (S618).

The controlling unit 211 scrolls the confirmed character string 242 upward, and reconfigures the output area 243 (S620). The controlling unit 211 also notifies the receiving unit 221 (in the input server 220) of the reconfigured display information (S622), and the control moves to S611.

Following step S616, the receiving unit 221 judges whether or not an instruction to convert an editing character or an editing character string has been received (S702). If the conversion instruction has been received, then the character string editing unit 223 converts the editing character or the editing character string, and the output management unit 224 displays the converted editing character or editing character string in the output area 243 (S704).

The receiving unit 221 judges whether or not a confirmation event has been received from the input operating unit 230 (S706). If a confirmation event has not been received, then the control returns to S702, and if a confirmation event has been received, then the character string editing unit 223 sends a converted character or character string to the application device 210, as a confirmed character string (S708).

The controlling unit 211 of the application device 210 displays the confirmed character string in the display area 241 of the display unit 240 (S710), and the control returns to S602. Also, the output management unit 224 deletes the editing character string that has been displayed.

If it judged in S702 that the conversion instruction has not been received, then the control returns to S604.

In step S802, the application device 210 shifts rightward a part of the confirmed character string that starts with the cursor.

The output management unit 224 inserts and displays an editing character, as shown in FIG. 4C (S804).

If the state of the editing character has changed, then the state notifying unit 225 notifies the application device 210 of the state change (S806).

The application device 210 displays a guidance in the guidance display area 245 (S808), and the control moves to S702.

If it is judged in S604 that the notified operation event is not a character input, then the receiving unit 221 judges whether or not the notified operation event is a character deletion (S624).

If it is judged that the notified operation event is a character deletion, then the receiving unit 221 notifies the character string editing unit 223 of a character to be deleted. The character string editing unit 223 deletes the character from the temporary storing unit 222 (S902), and notifies the state notifying unit 225 that the character has been deleted. Also the character string editing unit 223 notifies the output management unit 224 of the character to be deleted.

When instruction to delete an editing character such as "た" shown in FIG. 5C is received, the state notifying unit 225 notifies the application device 210 of the state of the character deletion (S904).

The controlling unit 211 of the application device 210 shifts leftward a part of the confirmed character string that starts with the cursor (S906), and the output management unit 224 deletes the editing character displayed in the display area 241 (S908). The output management unit 224 judges whether the editing character string has been deleted (S909). If the editing character string has been deleted, then the output management unit 224 notifies the state notifying unit 225 of the deletion of the editing character string. If the editing character string has not been deleted, then the control returns to S604.

The state notifying unit 225 notifies the application device 210 that the editing character has been deleted (S910).

The controlling unit 211 of the application device 210 displays a guidance, which corresponds to the "uninput" state of the editing character, in the guidance display area 245, as shown in FIG. 5B (S912), and the control moves to S702.

If it is judged in S624 that the notified operation event is not a character deletion, then the receiving unit 221 judges that the operation instruction event received from the input operating unit 230 is to be processed by the application device 210, and the event is processed by the application device 210 (S626). The application device 210 performs a process corresponding to the application according to, for example, the operation instruction, and the control returns to S604.

In the above description, it is stated that in step S614, the state notifying unit 225 notifies the application device 210 of a state change from "uninput" to "input" with respect to the input of an editing character string. However, there is no need to notify in the step if there is no change in the state. Also, in the actuality, the state notifying unit 225 notifies the application device 210 of a state that the conversion process is in progress or the like, in step S704 for example. However, the description of it is omitted to avoid the complication.

In the above description, it is stated that an editing character is displayed in S612 after a confirmed character string is moved by scrolling in S620. However, conversely, the editing character string may be scrolled after the editing character is displayed. This will not confuse the user although the displayed editing character overlaps with the confirmed character string for a brief moment.

Also, in the embodiment described above, the display area 241 can display three rows of characters. In the case where the display area 241 can display only one row of characters, when the output area 243 does not have enough empty space to display an editing character, the confirmed character string may be scrolled leftward, instead of being scrolled upward.

In the embodiment described above, the character string is written horizontally. However, the present invention can be realized in the same way even in the case where the character string is written vertically. In this case, the character string may be scrolled rightward by one row, or a part of the character string that starts with the cursor may be moved downward or upward.

Also, in the embodiment the input server 220 receives an input of hiragana characters in Japanese. However, the input server 220 may have a function to convert characters in other languages.

INDUSTRIAL APPLICABILITY

A character string processing system of the present invention can be used as a character input device for displaying characters on a small display screen of mobile phone terminals, home electric appliances, industrial equipment or the like.

The invention claimed is:
1. A character string processing system comprising:
an application device for inline-displaying a character string in a display area; and
an input server for converting an input kana character string to a character string including kanji characters, the input kana character string being input by a user,
wherein the application device includes:
a first controlling unit operable to display a converted character string in the display area, and send, to the input server, display information identifying a residual portion of the display area; and
a second controlling unit operable, upon being notified, from the input server, of a character display state indicating that an empty space of the residual portion of the display area is not enough for displaying the input kana character string, to shift a part of the converted character string being displayed by the first controlling unit in the display area, so as to make a space in the residual portion of the display area for the input kana character string, and
wherein the input server includes:
a receiving unit operable to receive the display information from the first controlling unit of the application device, and receive the input kana character string input by the user;
a judging unit operable to judge whether or not the residual portion of the display area has enough empty space to inline-display candidate character strings, the candidate character strings being intermediate results of the conversion of the input kana character string;

a notifying unit operable, when the judgment unit judges that there is not enough empty space to inline-display the candidate character strings, to notify the second controlling unit of the character display state indicating that the empty space of the residual portion of the display area is not enough for displaying the candidate character strings; and a display controlling unit operable to control the application device to inline-display the candidate character strings in the space created by the shifting of the part of the converted character string performed by the second controlling unit.

2. An input server for converting an input kana character string input by a user to a character string including kanji characters, and outputting a converted character string to an application device for inline-displaying the converted character string in a display area, the input server comprising:

a receiving unit operable to receive, from the application device, display information identifying a residual portion of the display area, and receive the input kana character string input by the user;

a judging unit operable to judge whether or not the residual portion of the display area has enough empty space to inline-display candidate character strings, the candidate character strings being intermediate results of the conversion of the input kana character string;

a notifying unit operable, when the judgment unit judges that there is not enough space to inline-display the candidate character strings, to notify the application device of a character display state indicating that the empty space of the residual portion of the display area is not enough for displaying the candidate character strings; and a display controlling unit operable to, after the application device shifts a part of the converted character string being displayed by the application device in order to make a space in the residual portion of the display area for the candidate character strings upon the application device being notified of the character display state by the notifying unit, control the application device to inline-display the candidate character strings in the space created by the shifting of the part of the converted character string performed by the application device.

3. The input server of claim 2, wherein the display information includes information identifying a maximum length of the converted character string to be displayed in the display area, and includes position information identifying a position in the display area from which a next converted character string is to be displayed by the application device, wherein the judging unit judges, in accordance with the position information, whether or not the residual portion of the display area has enough empty space to inline-display the candidate character strings, wherein the application device performs the shifting of the converted character string by shifting forward a part of the converted character string that starts from the position identified by the position information, and wherein the display controlling unit controls the application device to inline-display the candidate character strings in the space created by the shifting of the part of the converted character string.

4. The input server of claim 2, wherein the display information includes information identifying a maximum length of the converted character string to be displayed in the display area, and includes position information identifying a position in the display area from which a next converted character string is to be displayed by the application device, wherein the judging unit judges, in accordance with the position information, whether or not the residual portion of the display area has enough empty space to inline-display the candidate character strings, and wherein the application device performs the shifting of the converted character string by scrolling.

5. A character string display method performed by an input server which converts an input kana character string input by a user to a character string including kanji characters, and outputs a converted character string to an application device which inline-displays the converted character string in a display area, the character string display method comprising:

receiving, from the application device, display information identifying a residual portion of the display area, and receiving the input kana character string input by the user;

judging whether or not the residual portion of the display area has enough empty space to inline-display candidate character strings, the candidate character string being intermediate results of the conversion of the kana input character string;

notifying, when the judging judges that the residual portion of the display does not have enough empty space to inline-display the candidate character strings, the application device of a character display state indicating that the empty space of the residual portion of the display area is not enough for displaying the candidate character strings; and controlling, after the application device shifts a part of the converted character string being displayed by the application device in order to make a space in the residual portion of the display area for the candidate character strings upon the application device being notified of the character display state by the notifying, the application device to inline-display the candidate character strings in the space created by the shifting of the part of the converted character string performed by the application device.

* * * * *